Patented Aug. 30, 1938

2,128,289

UNITED STATES PATENT OFFICE 2,128,289

CERAMIC DIELECTRIC MATERIAL AND PROCESS OF MAKING THE SAME

William Dubilier and Josef Oppenheimer, New York, N. Y.

No Drawing. Application November 16, 1936, Serial No. 111,082

14 Claims. (Cl. 25—156)

This invention relates to ceramic electrical condensers and similar electrical devices.

It is an object of the invention to increase the capacity of such condensers and devices without increasing their volume.

It is another object of the invention to increase the efficiency of such condensers, in particular when used for high voltages.

It is a further object of the invention to increase the efficiency of such condensers, in particular when used for high frequencies.

These and other objects of the invention will appear more clearly when the description proceeds.

It is to be understood however that the invention is by no means restricted to any exemplification given in the specification, but is to be understood in its broadest aspect from the appended claims.

It has been suggested to make the dielectric of electric condensers of ceramics, and materials have been developed the dielectric constant of which substantially exceeds that of paper, mica, and ordinary porcelain, having a dielectric constant below 10. The dielectric constants are brought up to 70 and 80. Such material causes, however, high electric losses.

According to this invention the dielectric is made substantially of an oxide of an element belonging to the fourth group of the periodical system and one or more oxides of elements of the second, third, and fourth groups of the periodical system.

According to the invention, a presintering step is applied in which the shaped and preferably highly pressed body is treated at a temperature of about 100° C. to 250° C. below high sintering temperature which is between about 1620° C. to 1680° C. Such a presintered or fritted body may then be introduced into the oven or furnace in which at least high sintering is performed.

In order to prevent any deoxidation of titanium oxide if it is used as a fourth group metal oxide a neutral atmosphere may be maintained in the oven during treatment, particularly at sintering temperatures. Such neutral atmosphere may be obtained by introducing a neutral gas which is stable at such high temperatures and does not reduce the titanium oxide. In particular, there may be used carbon-dioxide as such a gas. It will not be stable at the high temperatures involved, but will decompose partly into carbon-monoxide, carbon and oxygen. However, the equilibrium between these gases will remain stable, and if it is disturbed, the oxygen developed cannot deteriorate the titanium oxide, whereas the carbon is either deposited or combined with the material of the oven, or gives cause to superficial formation of a minute layer of titanium carbide on the outside of the sintered body. Titanium carbide is, as known to the art, a very poor conductor of electricity, and therefore does not substantially impair the qualities of the body obtained which is substantially still titanium oxide. Furthermore, such superficial minute layer can easily be removed after the body is solidified by grinding with a hard substance such as corundum powder, or other known hard grinding material. As another means for preventing deoxidation of oxide present in the body during sintering a vacuum of the highest possible degree may be applied to the furnace, or hydrogen introduced as a protective atmosphere.

The bodies obtained may be densified during solidification by applying high pressure of several hundred atmospheres to the mould. The highly sintered or melted bodies so obtained are dense, and of the high dielectric constants referred to above. Now the electrodes of the condensers may be applied in any well known way. Thus metal foils may be cut to the desired shape and applied to the body, then treated in vacuo, and resiliently pressed against the oxide body, while still in vacuo.

The dielectric body with the electrodes may be positioned between cushions of resilient material, arranged in a chamber which is connected over a conduct with valve to a vacuum pump. A plunger may resiliently press the electrodes with any desired pressure upon the sintered titanium oxide body. Thereby a tight adherence of the electrodes to the body is obtained, and no paste or other binding material is generally necessary any more, in particular if the electrodes are made of aluminium foil, lead, or any other relatively plastic metal or alloy composition. The condenser body so formed may then be varnished, if desired, for instance with bakelite-varnish, and it may also be baked at a low temperature up to about 200° C. to 300° C., or less, and never near a temperature at which the metal of the electrodes may soften. Such heating may be performed while the condenser is still in the chamber and to this effect in the cushions electric heat resistors may be positioned by which the cushions and the electrodes are heated to the desired temperature, while the electrodes are pressed against the condenser body.

There may also be provided any desired binding materials, such as waterglass, between the electrodes and the condenser body which however do not evaporate at operating temperatures and cause thereby the formation of dangerous interstices and invisible spaces between the electrodes and the condenser body. The electrodes may also be formed by precipitation upon the oxide body of a metal from a suitable solution. The portions of the body on which no electrode has to be applied may also be covered with a suitable material, such as plaster of Paris, and then dipped into molten metal, such as tin. The electrodes may also be applied by spraying on the material in a hot and finely divided form, as for instance by means of a Schoop pistol.

However, any other method of applying the electrodes tightly on the condenser body may be used.

Our invention includes the mixing of two or more oxides of elements of the fourth group of the periodical system, and there may be added oxides of elements or elements of the second and third group which are not or poorly electrically conductive, such as boron and boron oxide of the third group and aluminum oxide (alumina) of the second group. There may also be used elements of the fourth group, such as silicon, or silicon oxides, as suitable additions.

What we claim is:

1. In a method of manufacturing a dense ceramic dielectric material, in particular adapted for electric condensers, having a dielectric constant exceeding 14 and containing at least one inorganic oxide of an element of the fourth group and at least one other inorganic oxide of an element selected from the second, third and fourth group of the periodical system—the steps of shaping and presintering a finely divided, powdery mixture containing said oxides at a temperature substantially below its final sintering temperature, and thereupon compacting said mixture by heat treatment at least at sintering temperature in a selected atmosphere.

2. In a method of manufacturing a dense ceramic dielectric material, in particular adapted for electric condensers, having a dielectric constant exceeding 14 and containing at least one inorganic oxide of an element of the fourth group and at least one other inorganic oxide of an element selected from the second, third and fourth group of the periodical system—the steps of shaping and presintering a finely divided powdery mixture containing said oxides at a temperature substantially below its final sintering temperature, applying intense pressure for densifying the presintered mixture, and thereupon compacting said mixture by heat treatment in a selected atmosphere.

3. In a method of manufacturing a dense ceramic dielectric material, in particular adapted for electric condensers, having a dielectric constant exceeding 14 and containing at least one inorganic oxide of an element of the fourth group and at least one other inorganic oxide of an element selected from the second, third and fourth group of the periodical system—the steps of shaping and presintering a finely divided, powdery mixture containing said oxides at a temperature substantially below its final sintering temperature, and thereupon compacting said mixture in a crucible of highly refractory carbide by heat treatment at least at sintering temperature and in a selected atmosphere.

4. In a method of manufacturing a dense ceramic dielectric material, in particular adapted for electric condensers, having a dielectric constant exceeding 14 and containing at least one inorganic oxide of an element of the fourth group and at least one other inorganic oxide of an element selected from the second, third and fourth group of the periodical system—the steps of shaping under high pressure and presintering a finely divided, powdery mixture containing said oxides at a temperature substantially below its final sintering temperature, and thereupon compacting said mixture by heat treatment at least at sintering temperature in a selected atmosphere.

5. In a method of manufacturing a dense ceramic dielectric material, in particular adapted for electric condensers, having a dielectric constant exceeding 14 and containing at least one inorganic oxide of an element of the fourth group and at least one other inorganic oxide of an element selected from the second, third and fourth group of the periodical system—the steps of shaping and presintering a finely divided, powdery mixture containing said oxides at a temperature substantially below its final sintering temperature, and thereupon compacting said mixture by heat treatment at least at sintering temperature in a carbide forming atmosphere.

6. In a method of manufacturing a dense ceramic dielectric material, in particular adapted for electric condensers, having a dielectric constant exceeding 14 and containing at least one inorganic oxide of an element of the fourth group and at least one other inorganic oxide of an element selected from the second, third and fourth group of the periodical system—the steps of shaping and presintering a finely divided, powdery mixture containing said oxides at a temperature substantially below its final sintering temperature, and thereupon compacting said mixture by heat treatment at least at sintering temperature in a highly rarified atmosphere.

7. In a method of manufacturing a dense ceramic dielectric material, in particular adapted for electric condensers, having a dielectric constant exceeding 14 and containing at least one inorganic oxide of an element of the fourth group and at least one other inorganic oxide of an element selected from the second, third and fourth group of the periodical system—the steps of shaping and presintering a finely divided, powdery mixture containing said oxides at a temperature substantially below its final sintering temperature, and thereupon compacting said mixture by heat treatment at least at sintering temperature in a protective atmosphere.

8. A ceramic dielectric material compacted by heat treatment at least at sintering temperature and having a dielectric constant exceeding 14, said material substantially consisting of at least one oxide selected from a first group of oxides of the elements titanium, zirconium, and at least one additional inorganic oxide other than that belonging to said first group and selected from a second group of oxides of elements of the second, third and fourth group of the periodical system.

9. A method of manufacturing a dense ceramic dielectric material, in particular adapted for electric condensers, having a dielectric constant exceeding 14, comprising the steps of forming a finely divided powdery mixture containing at least one inorganic oxide of an element of the fourth group of the periodical system and at least one other inorganic oxide of an element selected from the second through fourth group of the periodical system, presintering said mixture at a temperature substantially below its sintering temperature, and thereupon compacting said presintered mixture by a treatment including heat treatment at least at sintering temperature in a selected atmosphere.

10. A method of manufacturing a dense ceramic dielectric material, in particular adapted for electric condensers, having a dielectric constant exceeding 14, comprising the steps of forming a finely divided powdery mixture containing at least one inorganic oxide of an element of the fourth group of the periodical system and at least one other inorganic oxide of an element selected from the second through fourth group of the periodical system, presintering said mixture at a temperature substantially below its sintering temperature, and thereupon compacting said presintered mixture by a treatment including heat treatment at least at sintering temperature in a selected atmosphere and under application of substantial superatmospheric pressure.

11. A method of manufacturing a dense ceramic dielectric body, in particular adapted for electric condensers, having a dielectric constant exceeding 14, comprising the steps of forming a finely divided powdery mixture containing at least one inorganic oxide of an element of the fourth group of the periodical system, at least one other inorganic oxide of an element selected from the second through fourth group of the periodical system, and an addition of at least one element having poor electrical conductivity as exemplified as to conductivity by boron and silicon and selected from the second through fourth group of the periodical system, presintering said mixture at a temperature substantially below its sintering temperature, and thereupon compacting said presintered mixture by a treatment including heat treatment at least at sintering temperature in a selected atmosphere.

12. A method of manufacturing a dense ceramic dielectric body, in particular adapted for electric condensers, having a dielectric constant exceeding 14, comprising the steps of forming a finely divided powdery mixture containing at least one inorganic oxide of an element of the fourth group of the periodical system, at least one other inorganic oxide of an element selected from the second through fourth group of the periodical system, and an addition of at least one element having poor electrical conductivity as exemplified as to conductivity by boron and silicon and selected from the second through fourth group of the periodical system, presintering said mixture at a temperature substantially below its sintering temperature, and thereupon compacting said presintered mixture by a treatment including heat treatment at least at sintering temperature in an oxygen containing atmosphere.

13. A ceramic dielectric body compacted by heat treatment at least at sintering temperature and having a dielectric constant exceeding 14, said body substantially consisting of at least one oxide selected from oxides of titanium and zirconium, at least one other inorganic oxide of an element selected from the second through fourth group of the periodical system and at least one additional element of poor electrical conductivity as exemplified as to conductivity by boron and silicon and selected from the second through fourth group of the periodical system, the outside of said body substantially consisting of oxide of elements contained.

14. A ceramic dielectric body compacted by heat treatment at least at sintering temperature and having a dielectric constant exceeding 14, said body substantially consisting of at least one oxide selected from oxides of titanium and zirconium, at least one other inorganic oxide of an element selected from the second through fourth group of the periodical system and at least one additional element of poor electrical conductivity as exemplified as to conductivity by boron and silicon and selected from the second through fourth group of the periodical system, the outside of said body substantially consisting of oxide and carbide of elements contained.

WILLIAM DUBILIER.
JOSEF OPPENHEIMER.